United States Patent [19]

Phillips

[11] Patent Number: 4,601,310
[45] Date of Patent: Jul. 22, 1986

[54] QUICK TURN METERING VALVE

[76] Inventor: Edwin Phillips, 700 Cedar Ave., P.O. Box 67, Middlesex, N.J. 08846

[21] Appl. No.: 452,721

[22] Filed: Dec. 23, 1982

[51] Int. Cl.$^4$ .................. F16K 37/00; F16K 1/54; F16J 9/00
[52] U.S. Cl. ........................... 137/556; 251/122; 251/903; 277/165; 277/147; 403/277
[58] Field of Search ............... 137/556.3, 556; 251/122, DIG. 4; 403/274, 276, 277, 280; 277/165, 147

[56] References Cited

U.S. PATENT DOCUMENTS

| 835,124 | 11/1906 | Webb | 403/280 |
|---|---|---|---|
| 2,931,673 | 4/1960 | Gondek | 277/165 |
| 3,085,592 | 4/1963 | Zajac et al. | 137/556 |
| 3,428,291 | 2/1969 | Callahan, Jr. et al. | 137/556.3 |
| 3,538,951 | 11/1970 | Bownass | 251/122 |
| 3,858,848 | 1/1975 | MacFetrich | 403/277 |
| 3,880,401 | 4/1975 | Wiltse | 251/DIG. 4 |
| 4,077,606 | 3/1978 | Dussia | 251/DIG. 4 |
| 4,243,202 | 1/1981 | Inamura | 251/DIG. 4 |

FOREIGN PATENT DOCUMENTS

| 2838976 | 3/1980 | Fed. Rep. of Germany | 251/122 |
|---|---|---|---|
| 638836 | 12/1978 | U.S.S.R. | 403/280 |

*Primary Examiner*—Alan Cohan
*Assistant Examiner*—John A. Rivell
*Attorney, Agent, or Firm*—Shoemaker and Mattare, LTD.

[57] ABSTRACT

A valve includes a body having a tapered protrusion on one end and a thin walled heel on the other end. A cap includes a shoulder about which the thin wall is flared to couple the cap to the body. A sleeve positioned on the body provides effective sealing between the body and a flow device.

36 Claims, 12 Drawing Figures

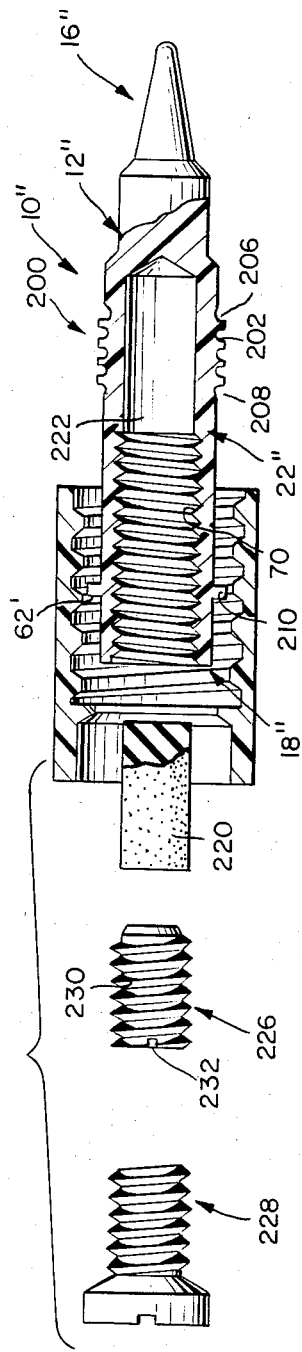
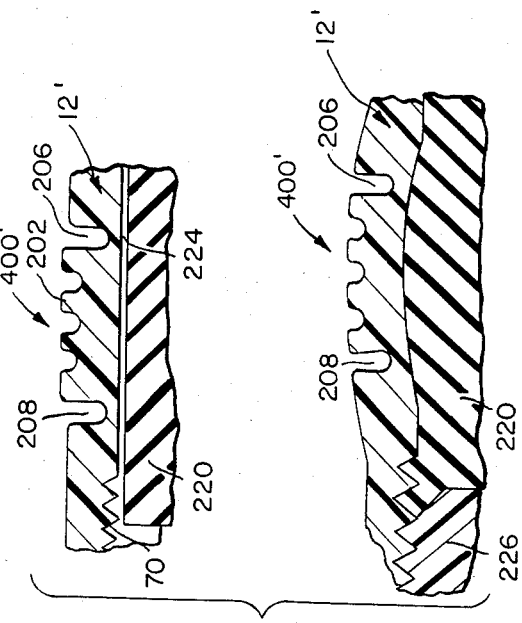
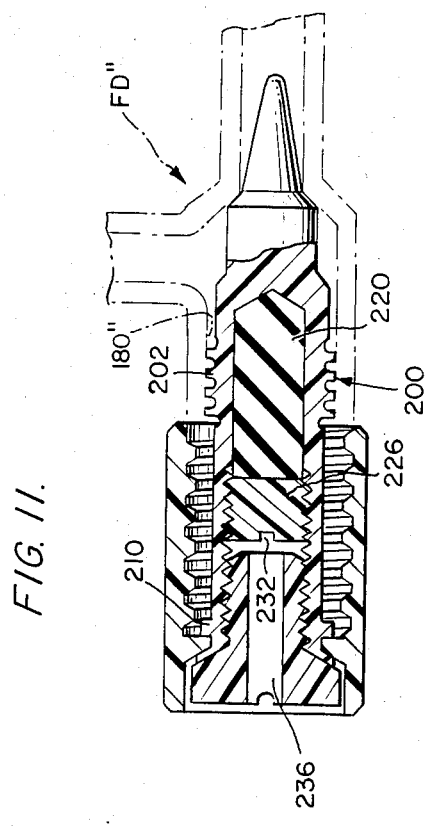

QUICK TURN METERING VALVE

BACKGROUND OF THE INVENTION

The present invention relates in general to flow control devices, and, more particularly, to valves.

In the chemical industry, there is a need for valves which can control the flow of very corrosive fluids, special fluids, and the like, under high vacuum conditions. In all cases, the control of the flow of fluids requires differences in physical size of the valves. There are manufacturing and cost advantages to produce one valve which, with slight modifications, will satisfy all requirements.

There is further need for a valve which can control fluid flow and in which small changes in the valve can produce large variations in fluid flow.

There is also need for a valve which can seal against a surface which varies in dimension and shape.

SUMMARY OF THE INVENTION

The valve means embodying the teaching of the present invention can control fluid flow of many types of fluids, including corrosive fluids, and has one size which needs only slight modification to accommodate various flow device sizes, shapes, and the like, as well as various surface configurations and conditions of the flow device.

The valve means includes a one-piece body having a conical portion on one end and a thin tubular wall on the other end. A bore extends through the wall into the body and a groove is defined circumambiently on the body. A shoulder is defined on the body at the intersection of the heel wall and the body.

A tubular cap includes a shoulder projecting radially inwardly of the cap.

The cap shoulder abuts the heel shoulder and the thin wall is flared over the cap shoulder to capture that shoulder between the heel shoulder and the thin wall and afix the cap to the body. A screw can be used to cause the wall flaring.

Sealing means is located in the groove and includes means for accommodating surface and size variations of a flow device in which the valve means is located. The sealing means includes an O-ring and/or a sleeve. The O-ring material can be modified to handle many liquids, such as water, gasoline, or the like.

The valve body and sleeve can easily be modified for use with very corrosive materials where a plastic material such as Teflon or glass is used for all parts. The preferred basic design is simply modified to use a Teflon sleeve where suitable.

In order to change the flow rate, the different physical size (2, 4, 8mm valves) will be eliminated and one size valve for a range of flow rates will be used with a tapered protrusion.

Fastening means on the cap cooperate with fastening means on a flow device to movably affix the valve means to that flow device. The fastening means can include double lead screw threads if desirable.

OBJECTS OF THE INVENTION

It is a main object of the present invention to provide a valve means which can control flow of corrosive fluids under a wide variety of conditions.

It is another object of the present invention to provide a valve means which can control flow of corrosive fluids and can accommodate wide variations in size, shape and surface characteristics of a flow device used in conjunction with the valve means.

It is a further object of the present invention to provide a valve means which can control flow of corrosive fluids and which can be easily modified to accommodate a wide variety of conditions.

It is yet another object of the present invention to provide a valve means which can control flow of corrosive fluids and which can be easily and effectively sealed against a surface having irregular surface conditions.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIGS. 10 and 11 show an alternative form of the valve means embodying the teachings of the present invention.

FIG. 12 shows a sealing means used by the valve shown in FIGS. 10 and 11.

DETAILED DESCRIPTION OF THE INVENTION

Figure 1:
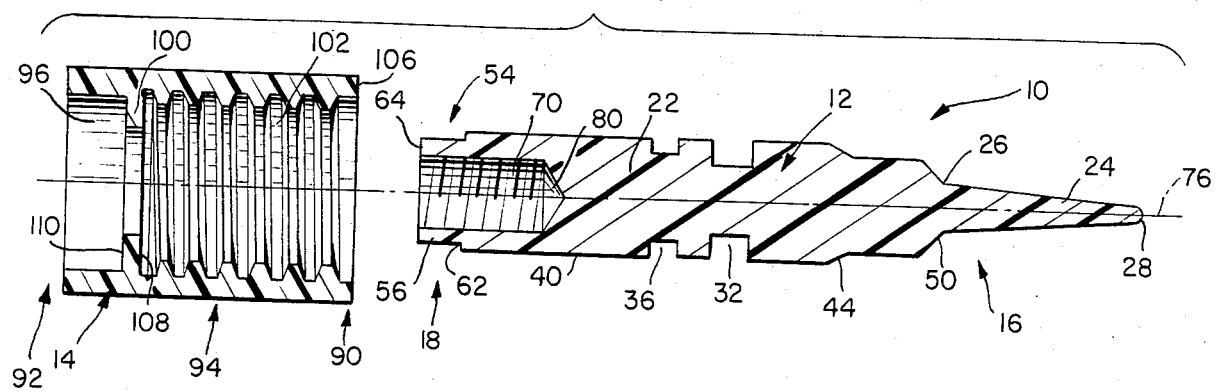
FIG. 1 is an elevation view of the valve means embodying the teachings of the present invention, with the valve means being in two parts.

Shown in FIGS. 1-4 is valve means 10 which includes a body 12 and a removable cap 14. The body includes a fore portion 16, an aft portion 18 and a stepped trunk portion 22. The fore portion includes a conical protrusion 24 and includes a base 26 and an apex 28. The cap 14 and the valve body 16 are generally made of different plastic materials. The valve body is usually made of a highly corrosive resistant material which characteristically has a low coefficient of friction.

A rectangular fore groove 32 and a rectangular aft groove 36 are defined in surface 40 of the body trunk to be circumambient the body, and a forwardly sloping shoulder 44 divides the trunk section into a fore trunk section and an aft trunk section. A further sloping shoulder 50 divides the trunk portion from the fore portion.

Figure 3:
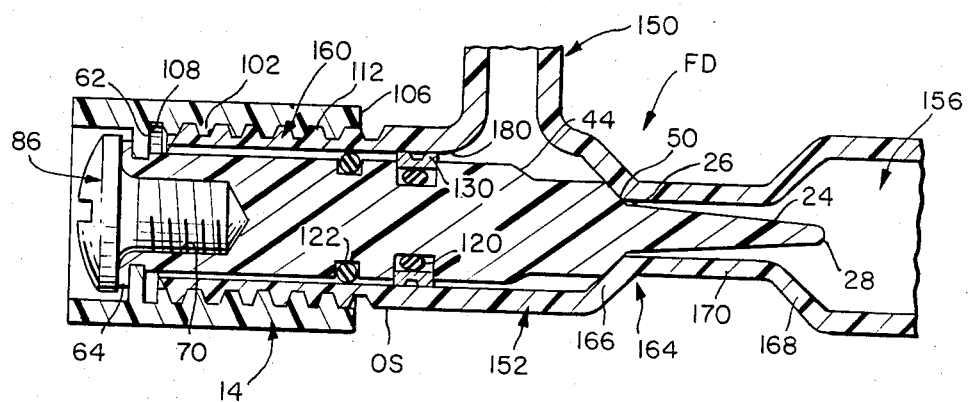
FIG. 3 is an elevation view of a valve means of the present invention occluding a flow device.

A rear heel portion 54 includes a thin tubular wall 56. The wall 56 is integral with the trunk of the body, and because the heel is thin walled, a rear shoulder 62 is defined on the body trunk portion. The heel portion terminates with an aft rim 64 of the thin wall 56. A threaded bore 70 is defined in the trunk portion to extend from adjacent to the shoulder 62 along the longitudinal centerline 76 of the valve body for a pre-selected distance. The bore 70 has a conical blind end 80. A screw 86 is received in the threaded bore 70 as best shown in FIG. 3. The function and operation of this heel portion and screw will be discussed below.

The cap 14 includes a fore end portion 90, an aft end portion 92 and a trunk portion 94. A bore 96 is defined to extend longitudinally through the cap and an annular shoulder 100 extends radially inwardly of the base at a pre-selected location to separate the cap into the just-mentioned fore and aft portions. The bore 96 is partially threaded and threads 102 extend from cap fore end rim 106 to front surface 108 of the annular shoulder 100. The shoulder 100 also has a rear surface 110. The threads 102 cooperably engage threads 112 (see FIG. 3) defined in outer surface OS of a flow device FD to advance the cap onto the flow device, with retrograde motion of that cap removing the cap from that device.

Figure 2:
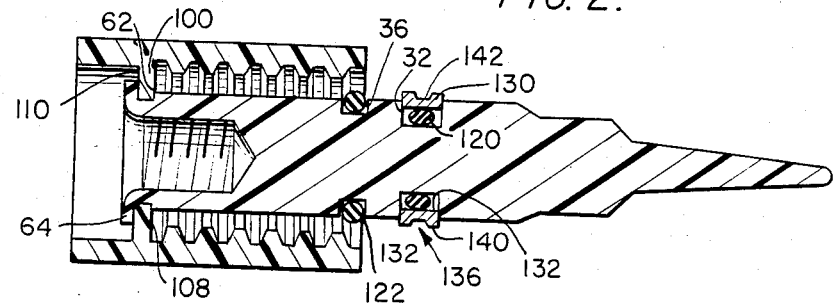
FIG. 2 is an elevation view of a valve means of the present invention in an assembled configuration.

In the embodiment shown in FIGS. 1-4, an O-ring 120 is located in groove 32 and an O-ring 122 is located in groove 36. An annular sleeve 130 includes a planar surface 132 and a grooved surface 136, and is accommodated in the groove 32 on the O-ring 120 with grooved surface 136 facing outwardly of the groove 32, as best shown in FIG. 2. The grooved outer surface thus includes outer surfaces 140 and a groove 142, with the outer surfaces being essentially coplanar with each other, and located to be radially outward of the O-ring 122, as best shown in FIG. 3.

The flow device FD is shown in FIG. 3 to include an inlet portion 150, an body portion 152 and an outlet portion 156, as well as a rear valve entrance portion 160. The rear portion 160 and inlet portion are separated from the outlet portion by a flow control portion 164 which includes a converging section 166, a diverging section 168 and a throat section 170.

The converging section forms a valve seat which abuts the sloping shoulder 50 of the valve body. The shoulder 50 is, therefore, shaped and sloped accordingly to form a fluid-tight seal when the valve shoulder is in abutting contact therewith as shown in FIG. 3 to occlude the flow control device. The cone angle defined by the conically shaped protrusion 24 of the portion 16 cooperates with the converging portion and the flow portion to further control fluid flow through the flow device.

Figure 4:
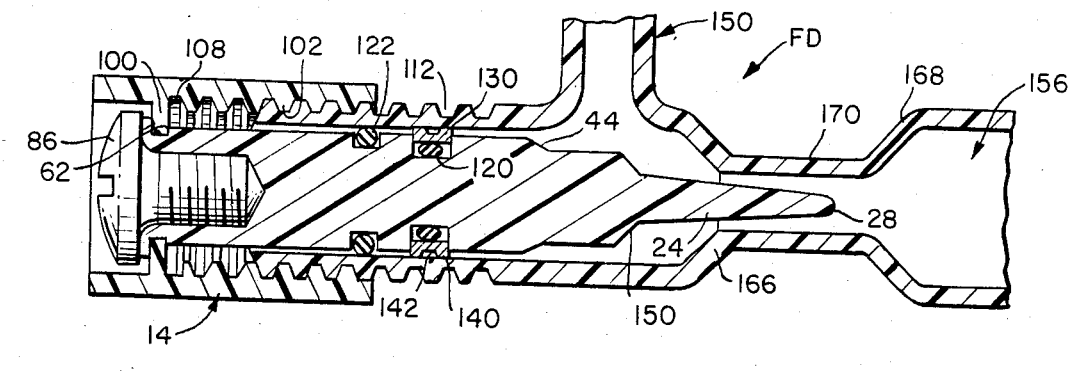
FIG. 4 is an elevation view of the valve means of the present invention partially closing a flow device.

As shown in FIGS. 3 and 4, the outer surface 140 of the sleeve 130 snugly abuts inner surface 180 of the flow device FD to seal the flow device at that location. This seal can vary in diameter as well as in shape due to the flexible nature of the sleeve 130 and the flexible nature of the O-ring 120. The sleeve 130 is preferably made of an easily deformable plastic material such as Teflon, and is larger in diameter than the inside diameter of the flow device. The O-ring is preferably rubber, and the inside diameter of the sleeve is smaller than the outside diameter of the O-ring. The deformation of the rubber will exert a force on the plastic sleeve, and this force allows the plastic sleeve to slowly deform in order to fit the variation in diameter of the flow device FD near the inlet location thereof. Such deformation will also permit the fitting of various contours of the flow device which may be caused by out of round conditions of the flow device at that location. It is important to note that the valve body 12 does not rotate while the valve is being opened and/or closed, and the plastic material of sleeve 130 changes shape more than a material such as rubber.

As best shown in FIGS. 2-4, in the assembled condition the front surface 108 of the annular shoulder 100 abuts the shoulder 62, and the length of the tubular heel portion exceeds the width of the annular shoulder 100. The tubular wall 56 is flared outwardly to overlap rear surface 110 of the shoulder 100. In the FIG. 2 configuration, the cap 14 is connected to the valve body 12 such that the elements are free to rotate with respect to the flow device FD. The cooperable association of the screw threads on the cap and on the flow device causes the valve to advance or retract with respect to the flow device throat when the cap and valve body are rotated with respect to the flow device. The cap and valve body can be screwed onto the flow device as tightly as possible to prevent the valve from rotating with respect to the flow device, and hence changing the setting of the valve, due to vibration or the like.

The screw 86, when tightened, increases the frictional engagement between the cap and the valve body by squeezing the shoulder 100 between the shoulder 62 and the outer surface of the thin wall 56.

As above discussed, the cap and the valve body are generally made of plastic materials. The seal effected between the sleeve 130 and the flow device permits the use of commercial grade tubing rather than any special high precision materials.

The cooperating threads on the cap and on the flow device can be selected to produce calibrated movement, or any other type of movement desired. For example, to produce a large degree of movement with each revolution of the cap, a double pitch thread can be used on the cap and on the flow device. The difference between the two pitches produces a rapid travel at the valve body, with a small rotation of the cap while maintaining the frictional advantages of the fine pitch thread.

Figure 5:
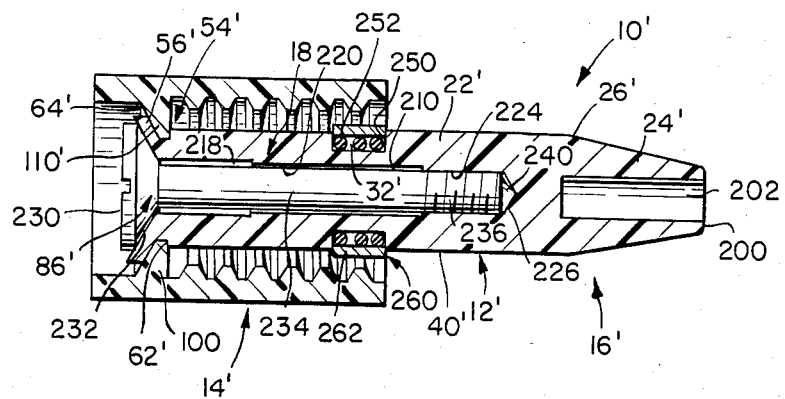
FIG. 5 is an elevation view of an alternative form of the valve means embodying the teachings of the present invention.
Figure 6:
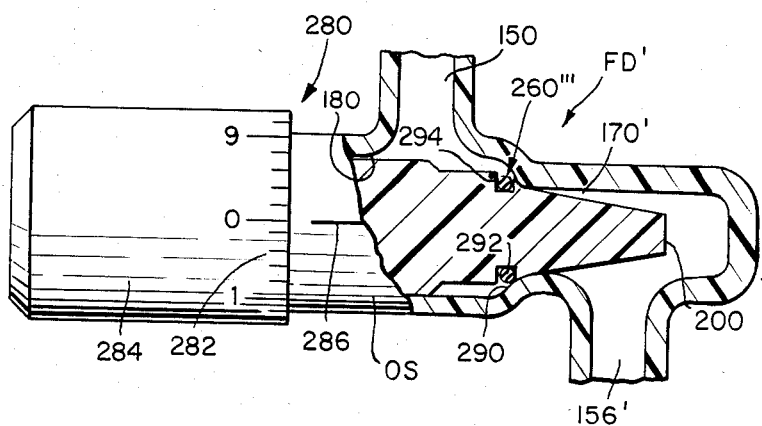
FIG. 6 is a partially cut away elevation view of another form of the valve means embodying the teachings of the present invention.

An alternative embodiment of the metering device is shown in FIGS. 5 and 6 and is indicated by a reference numeral 10'. The valve 10' includes a body 12' having a fore portion 16', an aft portion 18', and a trunk portion 22'. The fore portion 16' includes a frusto-conically shaped protrusion 24' and is forwardly convergent from a base 26' to a frustum 200.

The trunk 22' is essentially cylindrical and has a single groove 32' defined in outer surface 40' thereof. A heel portion 54' includes a thin tubular wall 56' which is integral with the trunk, and a shoulder 62' is defined at the juncture of the heel and the trunk.

A forward bore 202 is defined in the fore portion to extend longitudinally of the body for essentially the entire height of that frusto-conical portion. A stepped bore 210 is defined in the valve body to extend longitudinally of the body from rear rim 64' of the heel to a location between the base of the fore portion and the groove 32'. The bore 210 includes an entrance section 218, an intermediate section 220 having a smaller diameter than the entrance section, and a threaded section 224 and a conical blind-ended section 226.

Valve 10' includes a cap 14' which is similar to cap 14 except that shoulder 100' thereof includes a sloping rear surface 110' which slopes radially inward of the cap 14'.

An undercut screw 86' is used in conjunction with the valve 10' and includes a slotted head 230 with a sloping undersurface 232, a shank 234 with screw threads 236 defined thereon, and a forward, conical end 240. The screw threads can cover the entire length of the shank, or can be located only near the forward end 240 thereof to cooperably engage the threads of the bore section 224. The undersurface 232 is sloped to correspond to the slope of the shoulder surface 110'.

The undercut surface 232 and the sloped shoulder surface 110' trap the thin wall 56' therebetween as shown in FIG. 5 for the same purpose as was discussed above for body 10 with regard to the valve body 10', so that cap 14' is fastened to the valve body in a manner such that the cap can rotate with the body remaining longitudinally fixed with respect to that cap.

An important feature of the valve 10' is the groove 32'. As the screw 86' is tightened into the body 12', the groove 32' will be deformed and the width thereof as measured from side 250 to side 252 of the groove 32' will decrease.

Figure 7:
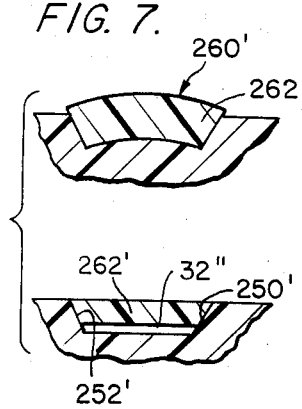
FIGS. 7-9 are elevation views showing alternative forms of a sealing means which is used in conjunction with the valve means of the present invention.
Figure 8:
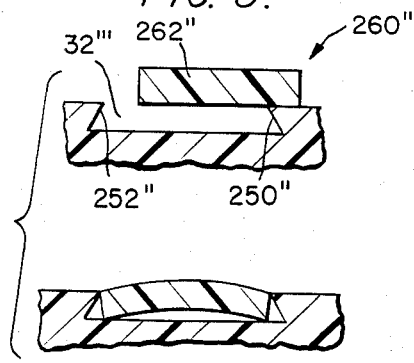
Figure 9:
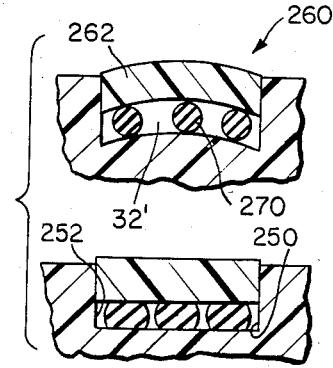

A sealing means 260 is positioned in the groove 32' and includes a sleeve 262 which is preferably formed of plastic-type material. Three forms of the sealing means are shown in FIGS. 7, 8 and 9. In FIG. 7, the sides 250' and 252' of groove 32" slope outwardly of that groove and sealing means 260' includes a trapezoidal sleeve 262' which is snugly accommodated in that groove. A normal position of the sleeve in the groove is shown in the bottom figure of FIG. 7, and a compressed configuration of that sleeve is shown in the bottom figure of FIG. 7. The compressed configuration is established when the screw 86' is taken up as above discussed. Thus, as the inner diameter of the flow device FD varies, the screw 86' can be adjusted to account for such inner diameter variation and to maintain a snug, tight fluid seal.

FIG. 8 shows a sealing means 260" which includes a trapezoidal groove 32''' with inwardly sloping sides 250" and 252" which accommodates a rectangular sleeve 262" in a released configuration (top figure) and a compressed configuration (bottom figure).

FIG. 9 shows the FIG. 5 sealing means 260 which includes a rectangular groove 32' which accommodates a rectangular sleeve 262 resting on top of a plurality of O-rings 270 in a released configuration (bottom figure) and a compressed configuration (top figure). The bottom of the groove distorts as shown in the top view of FIG. 9, thereby increasing the diameter of the seal. Preferably the sleeves of all these embodiments are made of corrosion resistant material.

The bore 202, along with the frusto-conical shape of the fore portion 16', can be used to control fluid flow through the valve. The bore 202 permits the valve body to flex in any direction to adjust the valve to seal with the flow device in spite of eccentricities and variations in sealing surfaces.

A suitable metering indicia 280 (as shown in FIG. 6) can be included on the valve cap, if desired, and includes a marking scale 282 on cap outer surface 284 and a reference line 286 on flow device outer surface OS.

The flow device FD' in FIG. 6 includes an outlet 156' which is orthogonally placed with respect to throat section 170' and is essentially parallel with respect to inlet section 150. The sealing means 260, 260' and/or 260" will abut the inner surface 180' of the flow device FD' to seal the flow device at that location, in the same manner as described for sleeve 130 in FIGS. 3 and 4. The converging section forms a seal when it abuts a valve seat surface 290. To further illustrate the versatility of this invention in the FIG. 6 embodiment, a simple O-ring 292 is placed in a rectangular groove 294 of the valve body to define a further alternative form 260''' to occlude the flow device. The bore 202 of FIG. 5 is not shown in FIG. 6, but can be included if suitable. The FIGS. 1 and/or 5 valves can also be used with either flow device FD or FD', as desired.

It is also noted that the sealing means shown in FIGS. 7-9 can be used with the valve means 10, if desired.

Shown in FIG. 10 is a valve means 10" which includes a body 12" having a fore portion 16", an aft portion 18" and a cylindrical trunk portion 22". A sealing means 200 is located near the fore portion and includes a plurality of projections 202 extending circumambiently about the valve body and being spaced apart longitudinally of that valve body. The sealing means 200 provides a means for effecting a secure seal even after the valve 10" is completely assembled and in use. A pair of grooves 206 and 208 define the boundaries of the sealing means. The body 12' is flexible at the sealing means location so that section flexes outwardly into a sealing position, as can be seen in FIG. 12, with the relaxed configuration being indicated by the reference numeral 400 and the deformed configuration indicated by the reference numeral 404'. The means creating this distortion will be discussed below.

A projection 210 forms a shoulder 62" which functions like the afore-discussed shoulder 62, and thus will not be discussed further.

A cylindrical mass of material 220 is accommodated in a void 222 defined in the body 12" adjacent to the sealing means 200. The material 220 is preferably resilient and has a volume larger than the volume of void 222.

A compression screw 226 is interposed between the screw 228 and the material 220. The screw 226 includes external screw threads 230 which cooperably engage the screw threads of the threaded bore 70, and screw 226 has a slot 232 on one end thereof. The slot 232 receives an appropriate adjusting tool to move the screw within the bore.

The screw 228 preferably includes a central bore 236 through which an adjusting tool is received to adjust the screw 226 in situ. The central bore 236 can be omitted if necessary, in which case the screw 226 can only be adjusted after the screw 228 is removed.

Movement of the adjusting screw 226 will produce the distortion of the sealing means shown in FIG. 12. As shown in FIG. 12, in the relaxed configuration, the mass 220 has an outer diameter slightly less than the inner diameter of the void 222 so that a gap 224 is defined. However, as discussed above, the material 220 has a volume larger than the volume of void 222 so that the material 220 has an axial length greater than the axial length of the void 222. However, upon tightening of the screw 226, the material 220 is forced radially outward. After the resilient material completely fills void 222, further inward movement of screw 226 creates the bulge indicated in FIG. 12 for the sealing means. This bulge increases the outer diameter of the valve at this location, and thereby increases any sealing pressure produced between the valve and an inner surface 180" of the flow device FD".

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A valve device comprising:
    a one-piece valve body having a fore end, an aft end and a trunk connecting said ends together;
    a heel section on said one-piece valve body aft end, said heel section including a thin tubular wall and a shoulder at the intersection of said wall and said one-piece valve body;
    a body bore defined longitudinally of said body through said heel section and into said trunk;
    a cap having a cap bore defined longitudinally therein, an annular shoulder mounted on said cap to project inwardly of said cap bore, and fastening means on said cap for releasably attaching said cap to a flow device; and
    flaring means for flaring said heel section thin wall of said one-piece valve body over said cap annular shoulder to capture said annular shoulder between said flared thin wall and said heel section shoulder for attaching said cap to said one-piece valve body in a manner which permits rotation of said cap relative to said valve body so that the valve body can be opened and closed without rotating.

2. The valve device defined in claim 1 further including seal means on said valve body for sealing against a flow device, said seal means including a groove defined in said valve body and a flexible sleeve positioned in said groove.

3. The device defined in claim 2 further including an O-ring located in said groove and supporting said sleeve.

4. The valve device defined in claim 3 wherein said sleeve includes a grooved outer surface and has an inner diameter less than the outer diameter of said O-ring and an outer diameter greater than an outer diameter of a flow device portion in which said valve body is located.

5. The valve device defined in claim 4 further including a second groove defined in said valve body and a second O-ring located in said second groove.

6. The valve device defined in claim 1 wherein said fore end includes a conical portion and a shoulder.

7. The valve device defined in claim 1 wherein said cap fastening means includes screw threads.

8. The valve device defined in claim 7 wherein said screw threads are double lead screw threads.

9. The valve device defined in claim 7 wherein said cap shoulder includes a tapered surface.

10. The valve device defined in claim 9 wherein said screw includes a head having a sloped portion which is sloped to correspond to said cap shoulder sloped portion.

11. The valve device defined in claim 2 wherein said groove has sloped walls.

12. The valve device defined in claim 11 wherein said groove walls slope outwardly of said groove and said sleeve is trapezoidally shaped.

13. The valve device defined in claim 11 wherein said groove walls slope inwardly of said groove and said sleeve is rectangularly shaped.

14. The valve device defined in claim 2 wherein said groove is rectangularly shaped, said sleeve is rectangularly shaped, and further including a plurality of O-rings interpositioned between said sleeve and a bottom of said groove.

15. The valve device defined in claim 1 further including indicia on said cap and a reference marker on said body.

16. The valve device defined in claim 1 further including a second bore defined in said fore end.

17. The valve device defined in claim 16 wherein said fore end includes a conical portion and a frustum.

18. The valve device defined in claim 1 wherein said body bore includes a threaded portion located between said groove and said fore end.

19. The valve device defined in claim 18 wherein said body bore is stepped.

20. The valve device defined in claim 1 wherein said body bore includes a threaded portion which extends from adjacent to said heel section shoulder for essentially the entire length of said body bore.

21. The valve device defined in claim 1 wherein said body bore includes a blind end.

22. The valve device defined in claim 1 further including a sealing means on said valve body near the middle thereof and valve body distorting means for distorting said valve body at said sealing means.

23. The valve device defined in claim 22 wherein said distorting means includes a void defined in said valve body near said sealing means, a mass of material accommodated in said void and compressing means for compressing said material into said void.

24. The valve device defined in claim 23 wherein said compressing means includes a screw threadably coupled to said body bore.

25. The valve device defined in claim 22 wherein said sealing means includes a plurality of spaced projections defined on the surface of said valve body.

26. The valve device defined in claim 1 wherein said body bore includes a threaded portion which extends from adjacent to said heel section shoulder for a substantial portion of the length of said body bore.

27. A valve device comprising:
    a one-piece valve body;
    a thin tubular wall at one end of said one-piece valve body and a shoulder circumambient the one-piece valve body on said one end thereof;
    a central bore longitudinally in said valve body;
    an adjusting cap mountable roratably upon said one end of said one-piece valve body, a longitudinal bore through the cap having an inwardly extending annular shoulder therein;
    seal means on said valve body for sealing against a flow device; and
    flaring means for flaring said thin wall over said cap annular shoulder to capture the annular shoulder between said flared thin wall and said shoulder of the one-piece valve body for attaching said cap to said one-piece valve body in a manner which permits rotation of said cap relative to said valve body so that the valve body can be opened and closed without rotating.

28. The valve device defined in claim 27 wherein said seal means on said valve body for sealing against a flow device includes at least one groove circumambient the valve body, and flexible sealing structure associated with said groove.

29. The valve device defined in claim 28 further including a flexible sleeve positioned in said groove, and at least one O-ring located in said groove and supporting said sleeve for biasing said sleeve outwardly for sealing purposes.

30. The valve device defined in claim 29 together with a flow device, and said sleeve includes a grooved outer surface and has an inner diameter less than the outer diameter of said O-ring and an outer diameter greater than an outer diameter of the flow device portion in which said valve body is mounted.

31. The valve device defined in claim 28 wherein said flexible sealing structure is biased outwardly by compressions means associated with the valve body.

32. The valve device defined in claim 31 wherein said compression means includes deformation of the valve body itself longitudinally to bring the side walls of said groove closer together.

33. The valve device defined in claim 32 wherein the shape of the side walls of the groove and the edges of the sleeve affect the outward bias of said sleeve.

34. The valve device defined in claim 31 wherein said compression means includes outward deformation of the midportion of the valve body.

35. The valve device defined in claim 34 wherein said sealing means includes a plurality of spaced projections defined on the surface of said valve body.

36. The valve device defined in claim 31 wherein said compressing means includes a screw threadably mounted in said body bore.

* * * * *